(12) United States Patent
Masuda (10) Patent No.: US 10,759,402 B2
(45) Date of Patent: Sep. 1, 2020

(54) ELECTRIC BRAKING SYSTEM

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 11 days.

(21) Appl. No.: 15/918,495

(22) Filed: Mar. 12, 2018

(65) Prior Publication Data

US 2018/0201240 A1 Jul. 19, 2018

Related U.S. Application Data

(63) Continuation of application No. PCT/JP2016/076464, filed on Sep. 8, 2016.

(30) Foreign Application Priority Data

Sep. 14, 2015 (JP) .................. 2015-180506

(51) Int. Cl.
  *B60T 8/1761* (2006.01)
  *B60T 13/74* (2006.01)
  (Continued)

(52) U.S. Cl.
  CPC ............ *B60T 8/1761* (2013.01); *B60T 8/171* (2013.01); *B60T 8/172* (2013.01); *B60T 8/173* (2013.01);
  (Continued)

(58) Field of Classification Search
  CPC ........ B60T 8/1761; B60T 8/172; B60T 8/173; B60T 8/171; B60T 13/74; B60T 13/746;
  (Continued)

(56) References Cited

U.S. PATENT DOCUMENTS 4,923,255 A   5/1990 Braschel et al.
5,249,850 A * 10/1993 Kampfmann ........... B60T 8/173
                                                    303/165
(Continued)

FOREIGN PATENT DOCUMENTS

CN   102490705   6/2012
JP   2-11450    1/1990
(Continued)

OTHER PUBLICATIONS

Chinese Office Action dated Nov. 5, 2019 in corresponding Chinese Patent Application No. 201680052969.0.
(Continued)

*Primary Examiner* — Xuan Lan Nguyen (57) ABSTRACT

Provided is an electric braking system configured to prevent antilock control from being unintentionally ended so that the braking behavior can be stabilized. An antilock control function unit includes an antilock control intervention determination unit configured to determine whether or not to execute antilock control. A braking force control device includes a switching function unit configured to switch between follow-up control by a normal control unit and the antilock control by the antilock control function unit on the basis of the determination by the antilock control intervention determination unit. The antilock control intervention determination unit ends execution of the antilock control when, for example, a braking force under the antilock control becomes equal to or higher than a required braking force while the antilock control is being executed.

4 Claims, 6 Drawing Sheets

(51) Int. Cl.
*B60T 8/171* (2006.01)
*B60T 8/172* (2006.01)
*B60T 8/173* (2006.01)

(52) U.S. Cl.
CPC ............. *B60T 13/74* (2013.01); *B60T 13/746* (2013.01); *B60T 2240/00* (2013.01); *B60T 2250/04* (2013.01); *B60T 2270/10* (2013.01)

(58) Field of Classification Search
CPC ............. B60T 2270/10; B60T 2240/00; B60T 2250/04
See application file for complete search history.

(56) References Cited

U.S. PATENT DOCUMENTS

| | | |
|---|---|---|
| 6,905,181 B2 | 6/2005 | Iwagawa et al. |
| 2004/0113489 A1 | 6/2004 | Iwagawa et al. |

FOREIGN PATENT DOCUMENTS

| | | |
|---|---|---|
| JP | 5-178191 | 7/1993 |
| JP | 2002-160623 | 6/2002 |
| JP | 2003-247576 | 9/2003 |
| JP | 2004-142513 | 5/2004 |
| JP | 2014-51198 | 3/2014 |

OTHER PUBLICATIONS

International Search Report dated Oct. 25, 2016 in corresponding International Patent Application No. PCT/JP2016/076464.
Extended European Search Report dated Apr. 23, 2019 in corresponding European Patent Application No. 16846367.7 (8 pages).
Japanese Office Action dated Jun. 18, 2019 in corresponding Japanese Patent Application No. 2015-180506 (2 pages).
English Translation by WIPO of the International Preliminary Report on Patentability dated Mar. 29, 2018, in corresponding International Patent Application No. PCT/JP2016/076464, 6 pgs.

* cited by examiner

ELECTRIC BRAKING SYSTEM

CROSS REFERENCE TO THE RELATED APPLICATION

This application is a continuation application, under 35 U.S.C. § 111(a), of international application No. PCT/JP2016/076464, filed Sep. 8, 2016, which is based on and claims Convention priority to Japanese Patent Application No. 2015-180506, filed Sep. 14, 2015, the entire disclosure of which is herein incorporated by reference as a part of this application.

BACKGROUND OF THE INVENTION

Field of the Invention

The present invention relates to an electric braking system using an electric braking device such as an electric brake mechanism, and relates to the electric braking system which prevents antilock control from being unintentionally ended so that the braking behavior can be stabilized.

Description of Related Art

As an electric braking device or antilock control, the following technologies have been proposed.
1. An electric brake device which controls a braking force by use of an electric motor (Patent Document 1).
2. An antilock brake system which starts or ends pressure reduction in accordance with a degree of deceleration of a wheel speed (Patent Document 2).

RELATED DOCUMENT

Patent Document

[Patent Document 1] JP Laid-open Patent Publication No. 2003-247576
[Patent Document 2] JP Laid-open Patent Publication No. H02-011450

SUMMARY OF THE INVENTION

In a brake-by-wire system, which uses an electric motor, such as a system as in Patent Document 1 or a system using regenerative torque of an independent drive motor, performance improvement such as shortening of a braking distance can be generally expected with use of antilock brake control, for reasons such as excellent response characteristics, an excellent degree of freedom in braking force control, and an excellent control accuracy of braking force control. In the antilock brake control, it is required to exert the maximum braking force while avoiding locking of wheels.

For example, in an antilock control device, for a hydraulic brake, as in Patent Document 2, antilock control is started by a brake fluid being caused to move into a reservoir tank thereby to reduce the fluid pressure, when a wheel comes to have a locking tendency. The antilock control is ended by the brake fluid, which has been moved into the reservoir tank, being caused to return thereby to recover the fluid pressure. That is, the fluid pressure to be exerted during the antilock control is mostly limited by a fluid pressure in a master cylinder, and, once the brake fluid has been finished to be returned from the reservoir tank, the antilock control naturally ends and a shift to normal service braking is made.

Meanwhile, in a brake system, which uses an electric motor, such as a system as in Patent Document 1 or a system using regenerative torque of an independent drive motor, when control of a wheel speed, a slip rate, or the like is used during antilock control, no shift to normal service braking is made unless a change is made to the control on the basis of a clear prescribed condition. There is a possibility that, for example, antilock control continues without any shift to normal service braking, and intended braking force is not exerted, in a case where, for example, an operator or driver loosens braking, or the maximum frictional force increases due to a change in a road surface, after the antilock control is started.

In addition, in such a brake system using an electric motor, since braking force can be freely exerted, and since high-speed response is enabled, there is a possibility that a braking force equal to or higher than an originally required braking force is exerted momentarily during the antilock control in a case where, for example, a decreased slip rate is immediately returned. Thus, in a completely similar manner as in the antilock control device, for a hydraulic brake, as in Patent Document 2, when the antilock control ends corresponding to recovery of a decreased braking force, there is a possibility that the antilock control is unintentionally ended under the above-described condition, and that braking behavior becomes unstable.

An object of the present invention is to provide an electric braking system which, in antilock control for an electric braking device, prevents the antilock control from being unintentionally ended so that the braking behavior can be stabilized.

Hereinafter, in order to facilitate understanding of the present invention, the present invention will be described with reference to the reference numerals in embodiments for the sake of convenience.

An electric braking system according to the present invention includes: an electric braking device 1 including an electric motor 4 and configured to apply a braking force for braking a vehicle to a wheel 20; a braking force control device 2 configured to execute follow-up control through control of the electric motor 4 such that the braking force follows a given required braking force; a wheel speed estimator 17 configured to estimate a wheel speed which is a speed of the wheel for which a braking manipulation is performed; and a vehicle body speed estimation function unit 18 configured to estimate a vehicle body speed of the vehicle, wherein
the braking force control device 2 includes
a normal control unit 21 configured to execute the follow-up control such that the braking force follows the required braking force corresponding to an amount of manipulation of a brake manipulator 19 in the vehicle, and
an antilock control function unit 22 configured to detect, from the wheel speed estimated by the wheel speed estimator 17 and the vehicle body speed estimated by the vehicle body speed estimation function unit 18, a slip of the wheel 20 relative to a road surface with which the wheel 20 is in contact, and execute antilock control for reducing a slip amount,
the antilock control function unit 22 includes an antilock control intervention determination unit 29 configured to determine whether or not to execute the antilock control, in accordance with a predetermined condition,
the braking force control device 2 includes a switching function unit 23 configured to switch between the follow-up control by the normal control unit 21 and the antilock control by the antilock control function unit 22 on the basis of the determination by the antilock control intervention determination unit 29, and the antilock control intervention determination unit 29 ends execution of the antilock control when at least any one condition among the following conditions (1), (2), and (3) is satisfied while the antilock control is being executed.

Condition (1): when the braking force under the antilock control or the braking force which is obtained in the antilock control becomes equal to or higher than the required braking force.

Condition (2): when the required braking force becomes lower than such a braking force that the slip amount becomes equal to or lower than a predetermined value even without execution of the antilock control.

Condition (3): when the vehicle body speed becomes equal to or lower than a predetermined value.

The predetermined condition and the predetermined values in conditions (2) and (3) are determined by results of tests, simulations, or the like (including measurement result or knowledge obtained in the past).

According to this configuration, the normal control unit 21 executes the follow-up control such that the braking force follows the required braking force corresponding to the amount of manipulation of the brake manipulator 19. The antilock control intervention determination unit 29 determines whether or not to execute the antilock control, in accordance with the predetermined condition. The switching function unit 23 switches between the follow-up control by the normal control unit 21 and the antilock control by the antilock control function unit 22 on the basis of the determination by the antilock control intervention determination unit 29. While the antilock control is being executed by the antilock control function unit 22, a slip of the wheel 20 relative to a road surface with which the wheel is in contact is detected from the wheel speed and the vehicle body speed, and a slip amount is reduced.

Particularly, when at least any one condition among conditions (1), (2), and (3) is satisfied while the antilock control is being executed, the antilock control intervention determination unit 29 ends execution of the antilock control. In a case where, for example, the road surface frictional coefficient increases due to a change in the road surface state, or where the required braking force decreases during the antilock control, the target braking force by the antilock control is constantly equal to or higher than the required braking force corresponding to the present amount of manipulation of the brake manipulator 19 performed by an operator (condition (1)). In this case, the wheel 20 is not locked even without execution of the antilock control, and thus, the antilock control can be ended.

In a state of travel at a very low speed or in a vehicle-stoppage state, the antilock control is less important. Thus, when the vehicle body speed estimated by the vehicle body speed estimation function unit 18 becomes equal to or lower than the predetermined value (condition (3)), the antilock control can be ended. Besides the above, in a state where, for example, a braking force which does not cause locking of the wheel 20 in an estimated road surface state is obtained and the required braking force is lower than the braking force which does not cause the locking (condition (2)), the antilock control is not necessary. Thus, the antilock control can be ended. A shift from the antilock control to the normal control can be made by clearly setting a condition for ending the antilock control, as described above. Thus, the antilock control can be prevented from being unintentionally ended, whereby the braking behavior can be stabilized.

The antilock control intervention determination unit 29 may end execution of the antilock control when a value obtained by having the braking force, under the antilock control, passed through a predetermined delay element 29a becomes equal to or higher than the required braking force while the antilock control is being executed. The predetermined delay element 29a is determined by a result of a test, a simulation, or the like. In this case, by using the delay element 29a while the antilock control is being executed, a possibility can be avoided where the braking force under the antilock control momentarily exceeds the required braking force so that the antilock control is unintentionally ended.

The delay element 29a may be a low-pass filter which has a frequency characteristic equal to or lower than a frequency characteristic obtained by equal-ratio conversion of a steady-state gain, at an approximate-to-zero frequency, to "1" on the basis of a gain characteristic, of the slip amount of the wheel 20, relative to an input frequency of the braking force. By using such a low-pass filter, a possibility where the antilock control is unintentionally ended can be more reliably avoided.

As the braking force under condition (2), on the basis of a predetermined relationship between the slip amount of each wheel 20 and a deceleration of the vehicle, a braking force may be determined which is lower than a braking force for achieving such a slip amount that an increase in the slip amount does not cause any increase in the deceleration. This is because the antilock control is not necessary in a case where the required braking force is lower than the above-described braking force. The predetermined relationship is determined by a result of a test, a simulation, or the like.

The antilock control function unit 22 may include a control calculation unit 30 configured to cause, when execution of the antilock control is ended, a shift to be made over a predetermined time period from a braking force at a time of ending of the antilock control to a braking force to be executed the follow-up control by the normal control unit 21. The predetermined time period is determined by a result of a test, a simulation, or the like.

When there is a difference between the required braking force and a braking force at the time of ending of the antilock control, there is a possibility that the braking force rapidly changes over a short time period in association with the ending of the antilock control. Thus, when execution of the antilock control is ended, the control calculation unit 30 causes a shift to be made over the predetermined time period from a braking force at the time of the ending of the antilock control to a braking force, with respect to the required braking force, to be obtained by the normal control unit 21. Accordingly, the braking force can be prevented in advance from being rapidly changed.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
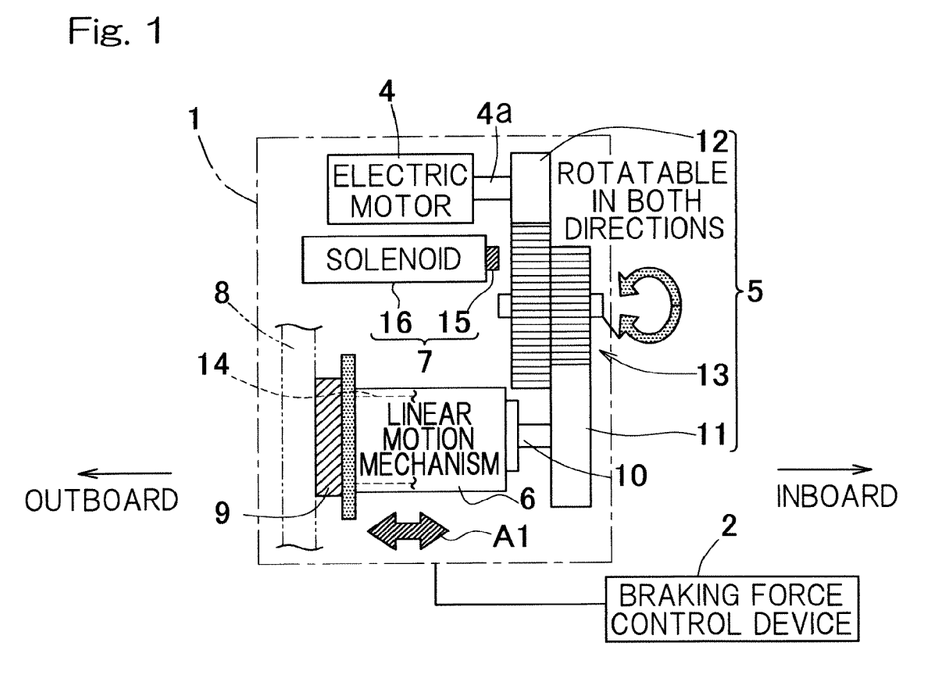
FIG. 1 is a diagram showing a schematic structure of an electric braking device of an electric braking system according to an embodiment of the present invention.

An electric braking system according to an embodiment of the present invention will be described with reference to FIGS. 1 to 5. As shown in FIG. 1, the electric braking system includes an electric braking device 1 and a braking force control device 2. First, the electric braking device 1 will be described.

Figure 2:
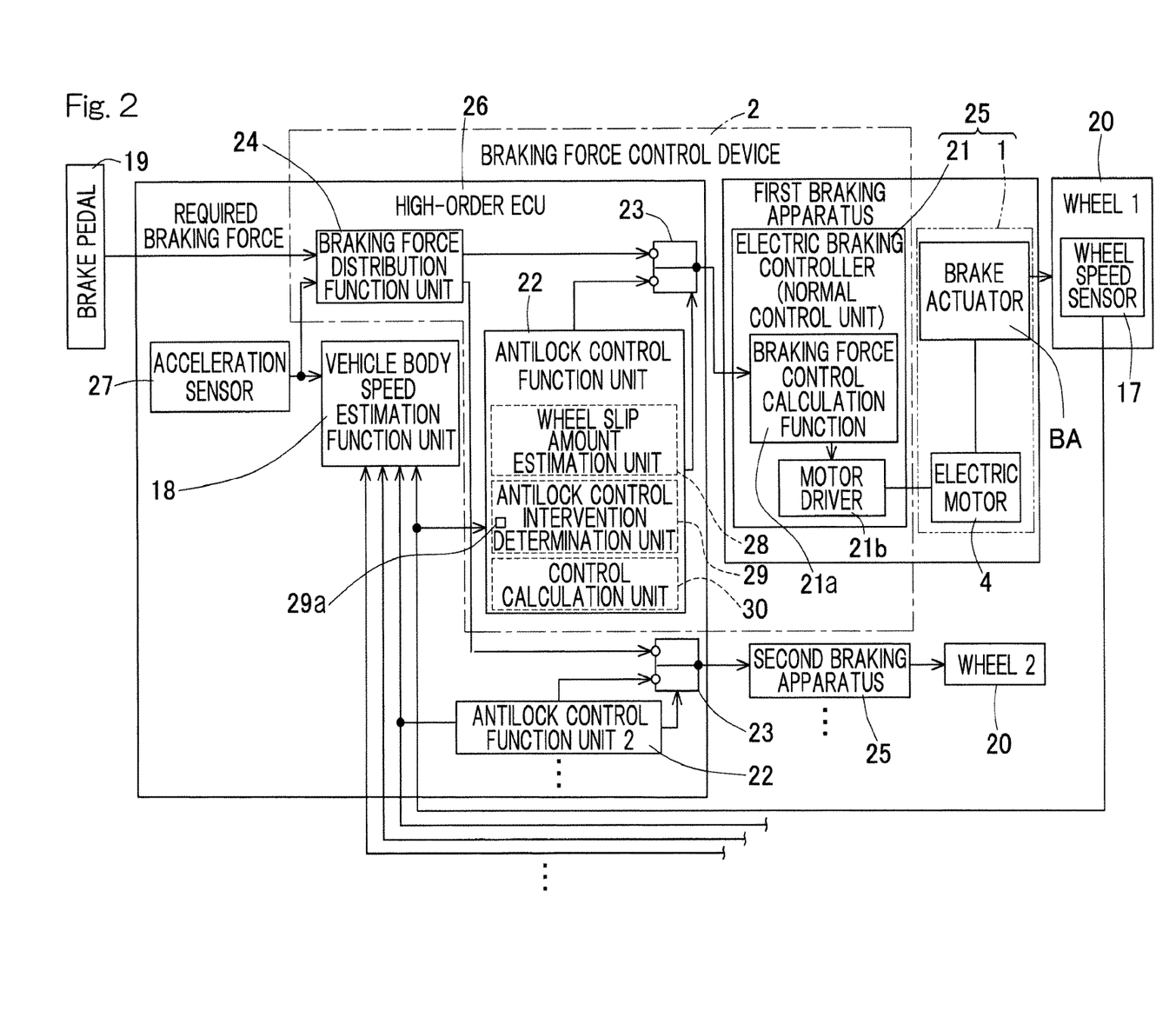
FIG. 2 is a block diagram of a control system of the electric braking system.

The electric braking device 1 includes: an electric motor 4; a speed reduction mechanism 5 which reduces a speed of rotation, or number of rotation per unit time, of the electric motor 4; a linear motion mechanism 6 which is a friction member manipulator; a parking brake mechanism 7 which causes a parking brake; a brake rotor 8 which is a rotational member; and a friction member 9. The electric motor 4, the speed reduction mechanism 5, and the linear motion mechanism 6 are incorporated in, for example, a housing which is not shown. The brake rotor 8 may be of a disc type or of a drum type. The friction member 9 is implemented by a brake pad, a brake shoe, or the like. The linear motion mechanism 6 is implemented by a feed screw mechanism such as a ball screw mechanism or a planetary roller screw mechanism. A portion of the electric braking device 1, other than the electric motor 4 is referred to as a brake actuator (BA: FIG. 2). The electric braking device 1 is provided to each wheel.

As the electric motor 4, for example, a brushless DC motor is preferably used which is excellent in torque density and output characteristics and which includes an exciting coil, a motor angle sensor, and a rotor having a permanent magnet (none of these components of the electric motor 4 are shown). The speed reduction mechanism 5 transmits rotation of the electric motor 4 to a tertiary gear 11 fixed to a rotational shaft 10, while reducing the speed of the rotation. The speed reduction mechanism 5 includes a primary gear 12, an intermediate (secondary) gear 13, and the tertiary gear 11. In this example, the speed reduction mechanism 5 can transmit, to the tertiary gear 11 fixed to an end of the rotational shaft 10, rotation of the primary gear 12 mounted to a rotor shaft 4a of the electric motor 4, while reducing the speed of the rotation by use of the intermediate gear 13.

In the linear motion mechanism 6, rotary motion outputted by the speed reduction mechanism 5 is converted to linear motion of a linear motion portion 14 by the feed screw mechanism so that the friction member 9 is brought into contact with the brake rotor 8 or is separated therefrom. The linear motion portion 14 is supported so as to be prevented from rotating and so as to be movable in an axial direction μl. The friction member 9 is provided to an outboard-side end of the linear motion portion 14. By rotation, of the electric motor 4, obtained via the speed reduction mechanism 5 being transmitted to the linear motion mechanism 6, the rotary motion is converted to the linear motion, and, by the linear motion being converted to a pressing force of the friction member 9, a braking force is generated. Term "outboard side" represents the outer side, of a vehicle, in the vehicle width direction and term "inboard side" represents the center side, of the vehicle, in the vehicle width direction, in a state where the electric braking device 1 is mounted in the vehicle.

The parking brake mechanism 7 includes a lock member 15 and an actuator 16. In the outboard-side end surface of the intermediate gear 13, a plurality of locking holes (not shown) are formed at regular intervals in the circumferential direction thereof. The lock member 15 is configured to be able to be locked in any one of the locking holes. For example, a solenoid is used as the actuator 16. By the lock member (solenoid pin) 15 being caused, by the actuator 16, to advance so as to be fitted in the locking hole formed in the intermediate gear 13 thereby to be locked in the locking hole, rotation of the intermediate gear 13 is prevented so that a parking lock state is assumed. By the lock member 15 being caused, by the actuator 16, to retreat so as to be separated from the locking hole, the rotation of the intermediate gear 13 is allowed so that an unlocked state is assumed.

The braking force control device 2 and the like will be described. To the electric motor 4 and the braking force control device 2, power is supplied from a power supply device which is not shown. FIG. 2 is a block diagram of a control system of the electric braking system including the antilock control device. The electric braking system includes the electric braking device 1, the braking force control device 2, a wheel speed estimator 17, and a vehicle body speed estimation function unit 18.

The braking force control device 2 executes follow-up control through control of the electric motor 4 such that braking force follows a given required braking force. The required braking force is also referred to as a target braking force value. The required braking force is given in accordance with the amount of manipulation of a brake pedal 19 (brake manipulator) performed by an operator or driver of the vehicle. In each of wheels 20 including drive motors (not shown) capable of driving the respective corresponding wheels independently of each other, regenerative torque of the drive motor may be used as the braking force. In this case, for a portion of or an entirety of the required braking force corresponding to the amount of manipulation of the brake pedal 19, a motor regenerative torque directly from the drive motor or a motor regenerative torque outputted via a speed reducer, etc. corresponds to the braking force.

The braking force control device 2 includes: an electric braking controller 21 (normal control unit) provided so as to correspond to the electric braking device 1 provided for each of the wheels 20; an antilock control function unit 22; a switching function unit 23; and a braking force distribution function unit 24. A first braking apparatus 25 includes: the electric braking device 1 provided to one of the wheels 20; and the electric braking controller 21 provided so as to correspond to the electric braking device 1. A second braking apparatus 25 and the like corresponding to the other wheels 20 respectively have the same configuration as that of the first braking apparatus 25, and exhibit operation and advantageous effects similar to that of the first braking apparatus 25, and thus, the description thereof is omitted.

The electric braking controller 21 includes: a braking force control calculation function 21a which executes control calculation for exertion of the given required braking force; and a motor driver 21b which drives the electric motor 4. The braking force control calculation function 21a which executes the control calculation is implemented by, for example, a calculator such as a microcomputer, an FPGA, an ASIC, or a DSP. The motor driver 21b is considered to be preferably implemented by, for example, a switch element such as an MOSFET or an IGBT. The electric braking controller 21 is implemented by, for example, an inverter device.

A high-order ECU (Electronic Control Unit) 26 which is a higher control unit of the electric braking controller 21 includes the antilock control function unit 22, the braking force distribution function unit 24, the switching function unit 23, the vehicle body speed estimation function unit 18, and an acceleration sensor 27. The high-order ECU 26 may be, for example, a VCU (Vehicle Control Unit) for this vehicle. As functions of the VCU (ECU), the function units 18, 22, 23, and 24, and the acceleration sensor 27 can be realized. Generally, VCUs have relatively high calculation performance and can execute complicated calculation.

For each wheel 20, the braking force distribution function unit 24 can determine a braking force corresponding to an arbitrarily required braking force in accordance with an orientation condition, a weight distribution of the vehicle, etc. The weight distribution of the vehicle is predetermined in, for example, vehicle specifications. The orientation condition is determined on the basis of the vehicle specifications and data from the acceleration sensor 27, etc.

The vehicle body speed estimation function unit 18 estimates a vehicle body speed of the vehicle with use of the acceleration sensor 27 and a wheel speed sensor (wheel speed estimator) 17 provided for each wheel 20. Besides the above, the vehicle body speed estimation function unit 18 can also improve the accuracy of estimation of the vehicle body speed with use of, for example, a GPS capable of high-speed calculation process. As the acceleration sensor 27, an acceleration sensor capable of executing measurement for three axes and measurement of moments about the respective axes is generally used.

As the wheel speed sensor 17, a sensor such as a generally-used ABS sensor configured to observe pulse outputs divided in a prescribed manner and corresponding to the circumferential direction of a wheel is preferably used, since such a sensor is inexpensive. Alternatively, in each of the wheels 20 including drive motors capable of driving the respective wheels independently of each other, a motor angle sensor or a sensorless angle estimation function for driving the drive motor may be used as the wheel speed sensor 17. By being implemented by the ABS sensor, the motor angle sensor, or the sensorless angle estimation function, the wheel speed sensor 17 corresponds to a wheel speed estimator.

From a vehicle body speed estimated by the vehicle body speed estimation function unit 18 and a wheel speed detected by the wheel speed sensor 17, the antilock control function unit 22 can determine a braking force for preventing the wheel 20 from being excessively locked upon braking, by wheel speed feedback control, brake pressure reduction control executed in association with determination of a locking tendency, or the like, and can intervene in control (brake control), as necessary.

The antilock control function unit 22 includes a wheel slip amount estimation unit 28, an antilock control intervention determination unit 29, and a control calculation unit 30. The wheel slip amount estimation unit 28 estimates a slip amount of the wheel 20. The wheel slip amount can be defined by, for example, the following formula.

wheel slip amount=(vehicle body speed−wheel speed)=(vehicle body speed)

In the above-described formula, the vehicle body speed is estimated by the vehicle body speed estimation function unit 18. The wheel speed is given by the wheel speed sensor 17.

The antilock control intervention determination unit 29 determines whether or not to execute antilock control, in accordance with a predetermined condition. Specifically, as the predetermined condition, when, for example, the wheel slip amount estimated by the wheel slip amount estimation unit 28 is higher than a prescribed value, the antilock control is started. Besides the above, the antilock control intervention determination unit 29 may separately include, for example, a process of making a shift to the antilock control when a wheel deceleration exceeds a prescribed value. The prescribed values are determined by results of tests, simulations, or the like.

Figure 4:
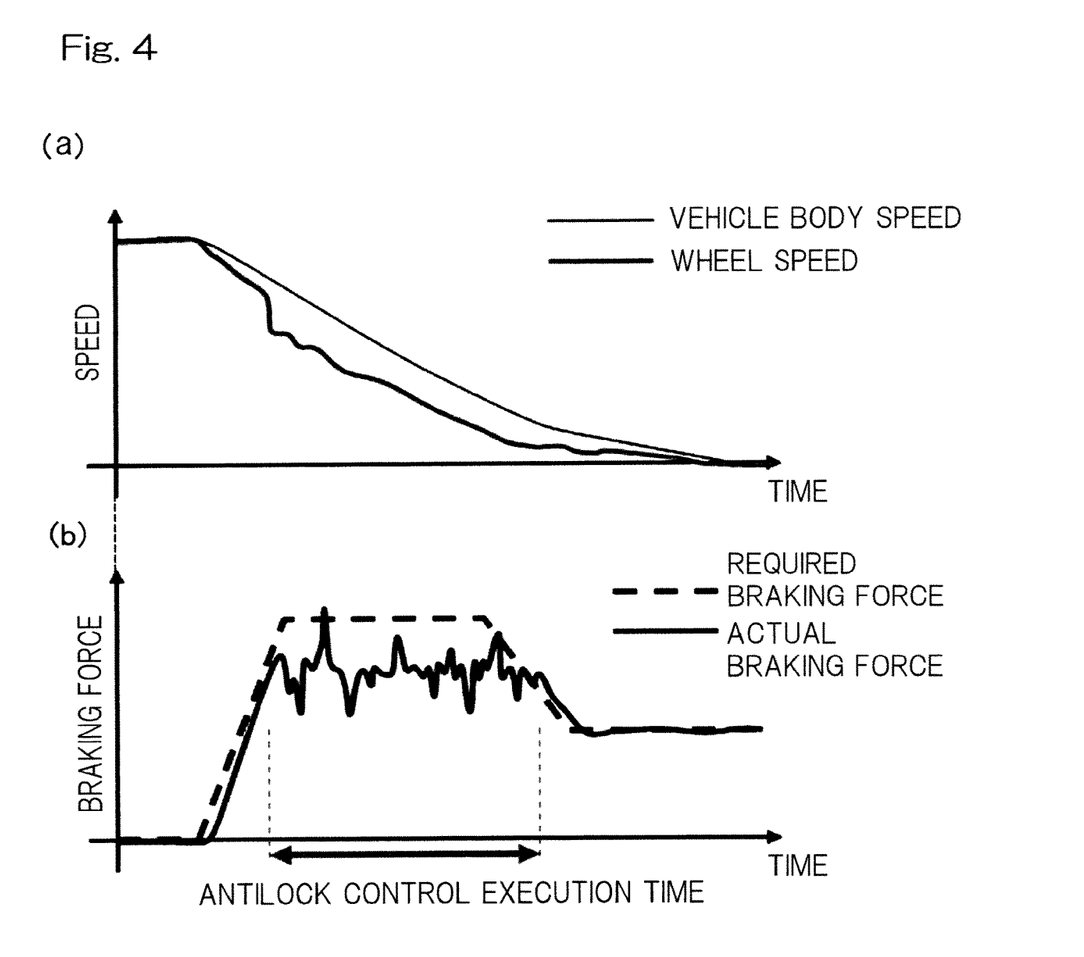
FIG. 4 shows graphs indicating an example of operation of antilock control by the electric braking system.

Upon reception of a command to start the antilock control, the switching function unit 23 performs switching, to the antilock control in which the antilock control function unit 22 intervenes, from the so-called follow-up control which is executed by the electric braking controller 21 and in which the antilock control function unit 22 does not intervene. That is, in order to cause switching of control in such a manner, for example, a signal is selected from between a signal from the antilock control function unit 22 and a signal from the braking force distribution function unit 24 in accordance with a selection signal from the antilock control intervention determination unit 29, and the selected signal is outputted from the switching function unit 23 to the electric braking controller 21. As shown in FIGS. 2 and 4, while the antilock control is being executed by the antilock control function unit 22, a slip of the wheel 20 relative to a road surface with which the wheel is in contact is detected from the wheel speed and the vehicle body speed, and the slip amount is reduced. While the antilock control is being executed, the control calculation unit 30 can reduce the slip amount by frequently repeating increase and decrease with respect to a braking command to the electric braking controller 21.

The antilock control intervention determination unit 29 ends execution of the antilock control when at least any one condition among the following conditions (1), (2), and (3) is satisfied while the antilock control is being executed:

condition (1): when the braking force under the antilock control becomes equal to or higher than the required braking force;

condition (2): when the required braking force becomes lower than such a braking force that the slip amount becomes equal to or lower than a predetermined value even without execution of the antilock control; and condition (3): when the vehicle body speed becomes equal to or lower than a predetermined value.

In a case where, for example, the road surface frictional coefficient increases due to a change in the road surface state, or where the required braking force decreases during the antilock control, the target braking force by the antilock control is constantly equal to or higher than the required braking force corresponding to the current amount of manipulation of the brake pedal 19 performed by the operator (condition (1)). In this case, the wheel 20 is not locked even without execution of the antilock control, and thus, the antilock control intervention determination unit 29 ends the antilock control.

In a state of travel at a very low speed or in a vehicle-stoppage state, the antilock control is less important. Thus, when the vehicle body speed estimated by the vehicle body speed estimation function unit 18 becomes equal to or lower than the predetermined value (condition (3)), the antilock control intervention determination unit 29 ends the antilock control.

Besides the above, in a state where, for example, a braking force which does not cause locking of the wheel 20 in an estimated road surface state is obtained, and the required braking force becomes lower than the braking force which does not cause the locking (condition (2)), the antilock control is not necessary. Thus, the antilock control intervention determination unit 29 ends the antilock control. As the braking force under condition (2), for example, on the basis of a predetermined relationship between a slip amount of each wheel 20 and a deceleration of the vehicle, braking may be determined which is lower than a braking force for achieving such a slip amount that an increase in the slip amount does not cause any increase in the deceleration. A shift from the antilock control to the normal control can be made by clearly setting the condition for ending the antilock control, as described above. Thus, the antilock control can be prevented from being unintentionally ended, whereby the braking behavior can be stabilized.

Figure 3:
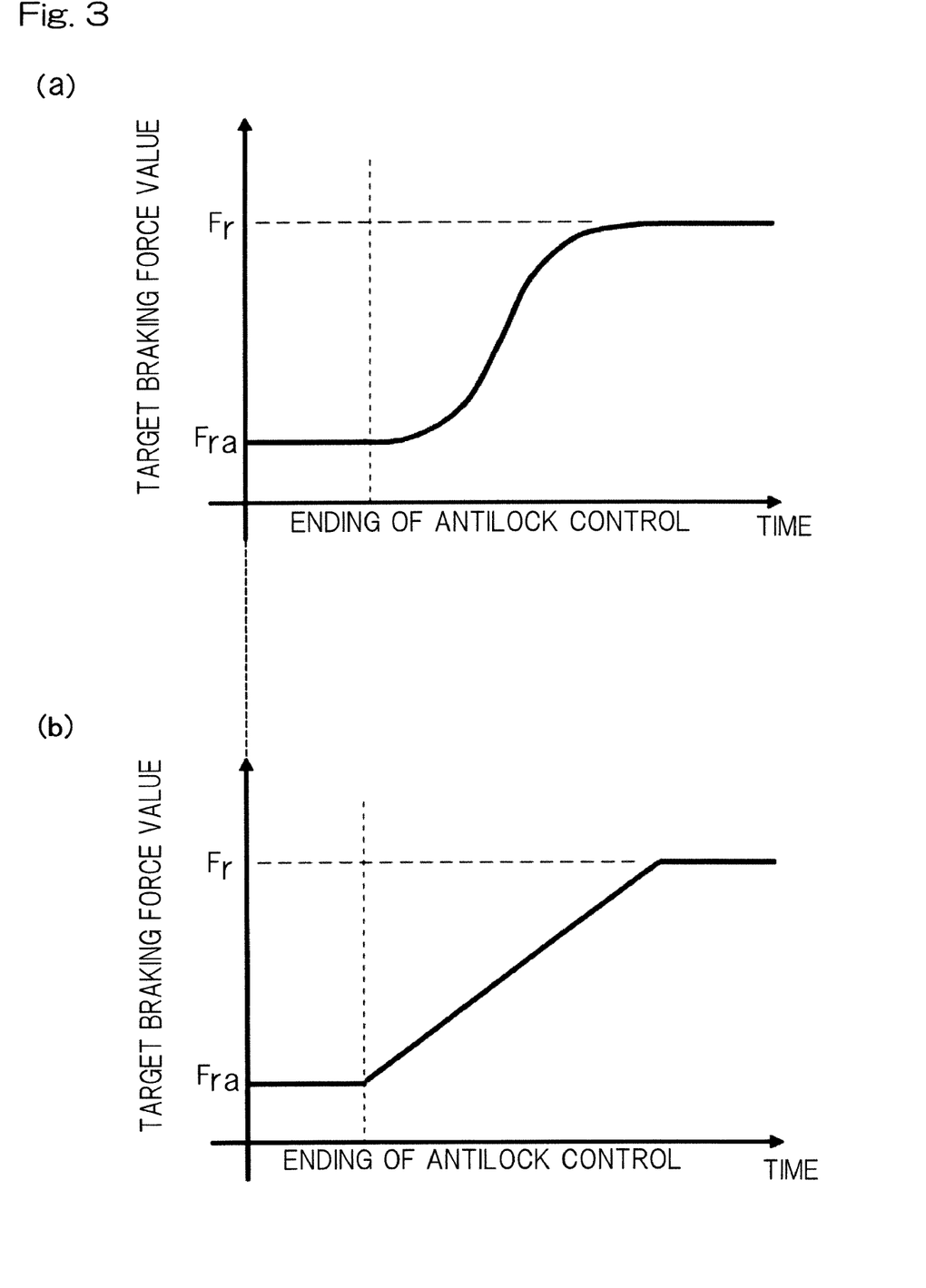
FIG. 3 shows graphs indicating examples where a required braking force (target braking force value) is mildly shifted, in the electric braking system.

Upon reception of an antilock-control ending command from the antilock control intervention determination unit 29, the switching function unit 23 performs switching to the follow-up control in which the antilock control function unit 22 does not intervene. That is, in order to cause switching of control in such a manner, for example, a signal is selected from between a signal from the antilock control function unit 22 and a signal from the braking force distribution function unit 24 in accordance with a selection signal from the antilock control intervention determination unit 29, and the selected signal is outputted from the switching function unit 23 to the electric braking controller 21. Here, FIG. 3 shows graphs indicating examples where the required braking force (target braking force value) is mildly shifted, in the antilock control device. The description thereof will be given also with reference to FIG. 2. When execution of the antilock control is ended, the control calculation unit 30 causes a mild shift to be made over a predetermined time period from a braking force at a time of the ending of the antilock control to a braking force which follows a required braking force for a case where the antilock control is not executed. Accordingly, after the antilock control is ended, the braking force can be prevented in advance from being rapidly changed.

In chart (a) of FIG. 3, the control calculation unit 30 causes a mild increase to be made, as the time passes, as for a target braking force value at the time of the ending of the antilock control, such that a quadratic curve is drawn. Subsequently, the control calculation unit 30 causes a gradual increase in the target braking force value to be made as the time passes. Thereafter, the control calculation unit 30 brings the target braking force value closer toward a desired required braking force $F_r$ for a case where the antilock control is not executed, such that a curve is drawn. In chart (b) of FIG. 3, a linear increase is made, over the predetermined time period, as for the target braking force value at the time of the ending of the antilock control, toward the desired required braking force $F_r$ for a case where the antilock control is not executed. In either chart (a) or (b) of FIG. 3, the braking force can be prevented in advance from being rapidly changed.

Figure 5:
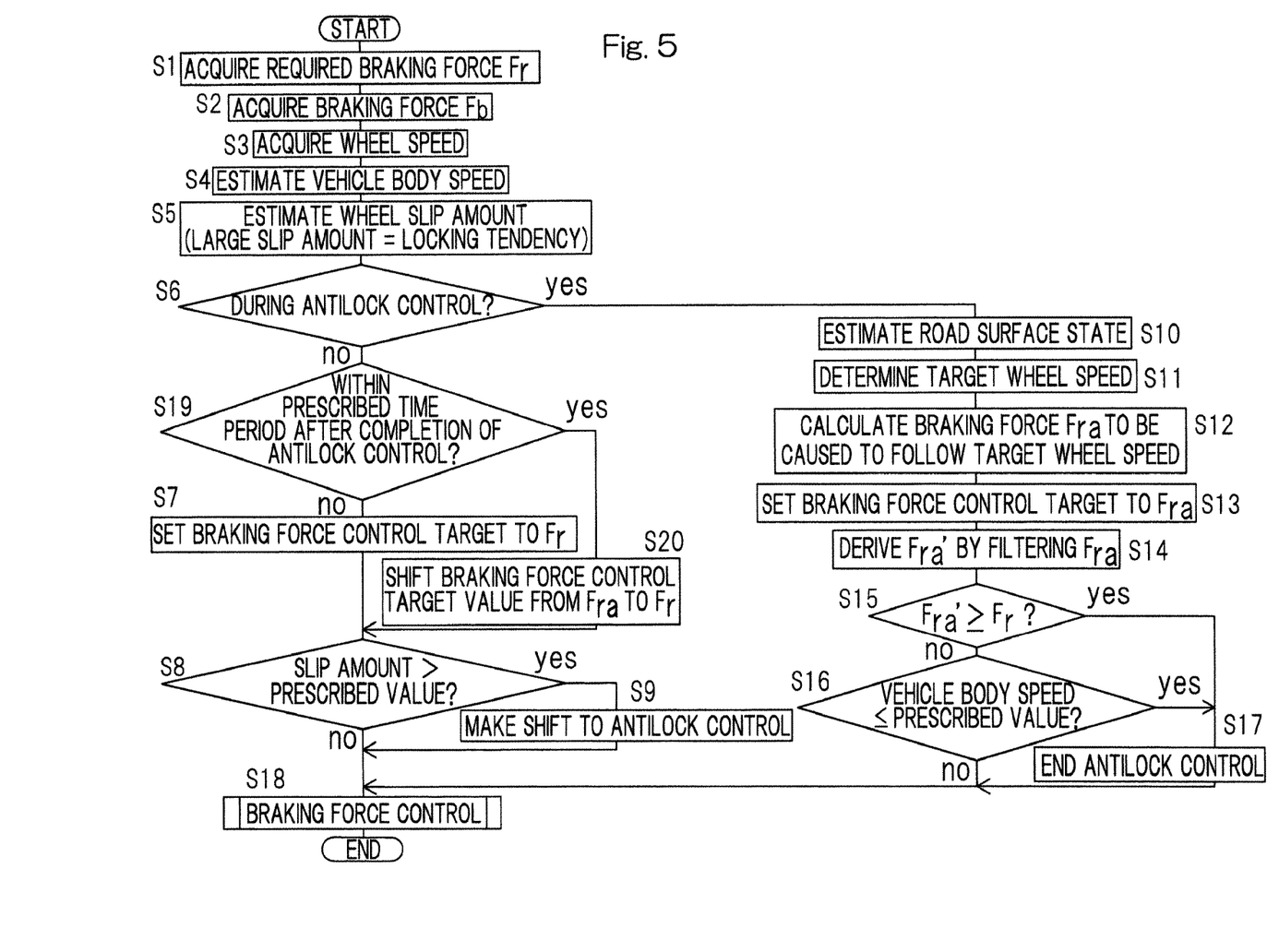
FIG. 5 is a flowchart indicating an example where the antilock control is executed by the electric braking system.

FIG. 5 is a flowchart indicating an example where the antilock control is executed by the antilock control device. The description thereof will be given also with reference to FIG. 2. The braking force control device 2 acquires a required braking force $F_r$ (step S1), and acquires a braking force $F_b$ on which the follow-up control relative to the required braking force $F_r$ is executed (step S2). The required braking force $F_r$ is given by, for example, an input from the brake pedal 19 in an automobile or vehicle, a value to be used in a VCU for the purpose of vehicle control such as prevention of a sideslip, or a combination of those. The braking force $F_b$ is estimated from, for example, a brake pedal manipulation amount and a value of current flowing in the electric motor 4.

Next, the wheel slip amount estimation unit 28 acquires a wheel speed from the wheel speed sensor 17 (step S3), and the vehicle body speed estimation function unit 18 estimates a vehicle body speed (step S4). The vehicle body speed during braking is obtained from, for example, the speed of a wheel having the highest rotation speed, integration of vehicle decelerations, or a combination of those. In a case where a GPS having a short update cycle or the like is provided, the vehicle body speed may be estimated from a shift in GPS positional information. The wheel slip amount estimation unit 28 estimates a slip amount of the wheel 20 from the wheel speed and the vehicle body speed (step S5).

Next, the antilock control intervention determination unit 29 determines whether or not the antilock control is being executed (step S6). When it is determined that the antilock control is being executed (step S6: yes), the antilock control function unit 22 estimates a current road surface state (step S10). The road surface state can be obtained or estimated by, for example: the slip amount in a state where a gradient of a correlation is zero or lower (the correlation is between the slip amount of each wheel 20 and the vehicle deceleration or an external force which is derived by a disturbance observer or the like and which is acting on the wheel 20); or comparison of the correlation with characteristics, of the wheel 20, measured in advance on various road surfaces.

Next, the antilock control intervention determination unit 29 determines a target wheel speed (step S11). The target wheel speed can be determined from, for example, a target slip amount determined from a frictional coefficient (estimated road surface frictional coefficient) corresponding to the road surface state estimated in step S10, and from the vehicle body speed estimated in step S4.

Next, the antilock control intervention determination unit 29 obtains a target braking force $F_{ra}$ to be used for the purpose of wheel speed control (step S12). The target braking force $F_{ra}$ can be obtained from, for example, a feedback control system using the braking force as an amount of manipulation and using the wheel speed as a control variable. Alternatively, from the wheel speed, the current braking force, the estimated road surface state, a wheel deceleration degree required to reach the target wheel speed, a table, etc. from which the target braking force $F_{ra}$ is derived may be created in advance, with use of a test, a simulation, or the like. In this case, the antilock control intervention determination unit 29 can derive the target braking force $F_{ra}$ from the above-mentioned table, etc. (step S13).

The antilock control intervention determination unit 29 uses, for the target braking force $F_{ra}$, a filter 29a which is a delay element (step S14). That is, the target braking force $F_{ra}$ is filtered so that an antilock control target braking force $F_{ra}'$ is derived. As the filter 29a, for example, a low-pass filter is considered to be preferably used which has a frequency characteristic equal to or lower than a frequency characteristic obtained by equal-ratio conversion of a steady-state gain, at an approximate-to-zero frequency, to "1" on the basis of a gain characteristic, of the slip amount of the wheel 20, relative to an input frequency of the braking force.

By the process of using the low-pass filter, in a case where, for example, such a braking force that an antilock control ending condition described later is momentarily satisfied is generated during the wheel speed control (in this example, when yes in step S15 or step S16 described later), a possibility where the antilock control is unintentionally ended can be avoided.

Next, the antilock control intervention determination unit 29 determines whether or not the antilock control target braking force $F_{ra}'$ is equal to or higher than the required braking force (step S15). In a case where, for example, the road surface frictional coefficient increases due to change in the road surface state, or a case where the required braking force decreases during the antilock control, the antilock control target braking force $F_{ra}'$ obtained by filtering becomes equal to or higher than the current required braking force required by the operator. In this case (step S15: yes), the wheel is not locked even without execution of the antilock control, and thus, the antilock control intervention determination unit 29 ends the antilock control (step S17).

Even if it is determined that the antilock control target braking force $F_{ra}'$ is lower than the required braking force (step S15: no), when it is determined that the vehicle body speed becomes equal to or lower than a predetermined value (step S16: yes), the antilock control intervention determination unit 29 ends the antilock control (step S17). This is because, in a state of travel at a very low speed or in a vehicle-stoppage state, the accuracy of detection of a wheel speed by a generally-used ABS sensor decreases thereby to cause highly accurate control to be difficult, and because, in a state of travel at a very low speed or in a vehicle-stoppage state, the antilock control is relatively unimportant. Besides the above, in a state where, for example, a braking force which does not cause locking of the wheel 20 in the estimated road surface state is obtained, and a case where the required braking force is lower than the braking force which does not cause the locking, the antilock control is not necessary, and thus, the antilock control intervention determination unit 29 is allowed to end the antilock control.

In a case where there is a difference between a braking force under the antilock control and the required braking force at a time of ending of the antilock control when the antilock control is ended, there is a possibility that the braking force rapidly changes in association with the ending of the antilock control. Thus, the control calculation unit 30 is configured to execute such a process that the braking force mildly changes (see FIG. 3), within a prescribed time period after the antilock control is ended, from the braking force under the antilock control to the required braking force (proceeding to step S20 is made when yes in step S19). After step S20, a shift to step S8 is made.

When it is determined that the antilock control is not being executed in step S6 (step S6: no), the control calculation unit 30 determines whether or not the time period having elapsed after completion of the antilock control is within the prescribed time period (step S19 described above). When it is determined, in step S19, that the time period having elapsed after completion of the antilock control is not within the prescribed time period (step S19: no), proceeding to step S7 is made. In step S7, the braking force control target (target braking force value) is set to $F_r$. Next, when the slip amount estimated by the wheel slip amount estimation unit 28 is higher than a prescribed value (step S8: yes), the control calculation unit 30 starts the antilock control (step S9). Besides the above-described process, for example, a process of proceeding to the antilock control when the wheel deceleration degree is higher than a prescribed value, may be separately included.

When the estimated slip amount is not higher than the prescribed value (step S8: no), or after step S9, the braking force control is executed (step S18). Thereafter, this process is ended. In step S18, the follow-up control is executed such that the braking force follows the target braking force determined in a preceding step.

The vehicle body speed estimation function unit 18, the braking force control calculation function 21a, the antilock control function unit 22, and the antilock control intervention determination unit 29 are specifically configured with a hardware circuit or a software mathematical function on a processor (not shown) which enable calculation and output of a result thereof, with use of a LUT (Look Up Table) implemented by software or hardware, or a prescribed transform function contained in a library of software or hardware equivalent thereto, and, as necessary, a comparison function or a four arithmetic operation function in the library or hardware equivalent thereto, etc.

Another embodiment will be described. In the following description of each embodiment, portions corresponding to the matters described in each preceding embodiment are designated by the same reference numerals, and the redundant description thereof is omitted. When only a part of a configuration is described, the remaining part of the configuration is the same as that of the previously described embodiment unless otherwise specified. The same advantageous effects are achieved by the same configuration. In addition to the combinations of portions described specifically in each embodiment, it is also possible to partially combine the embodiments unless any problem is particularly posed due to the combination.

Figure 6:
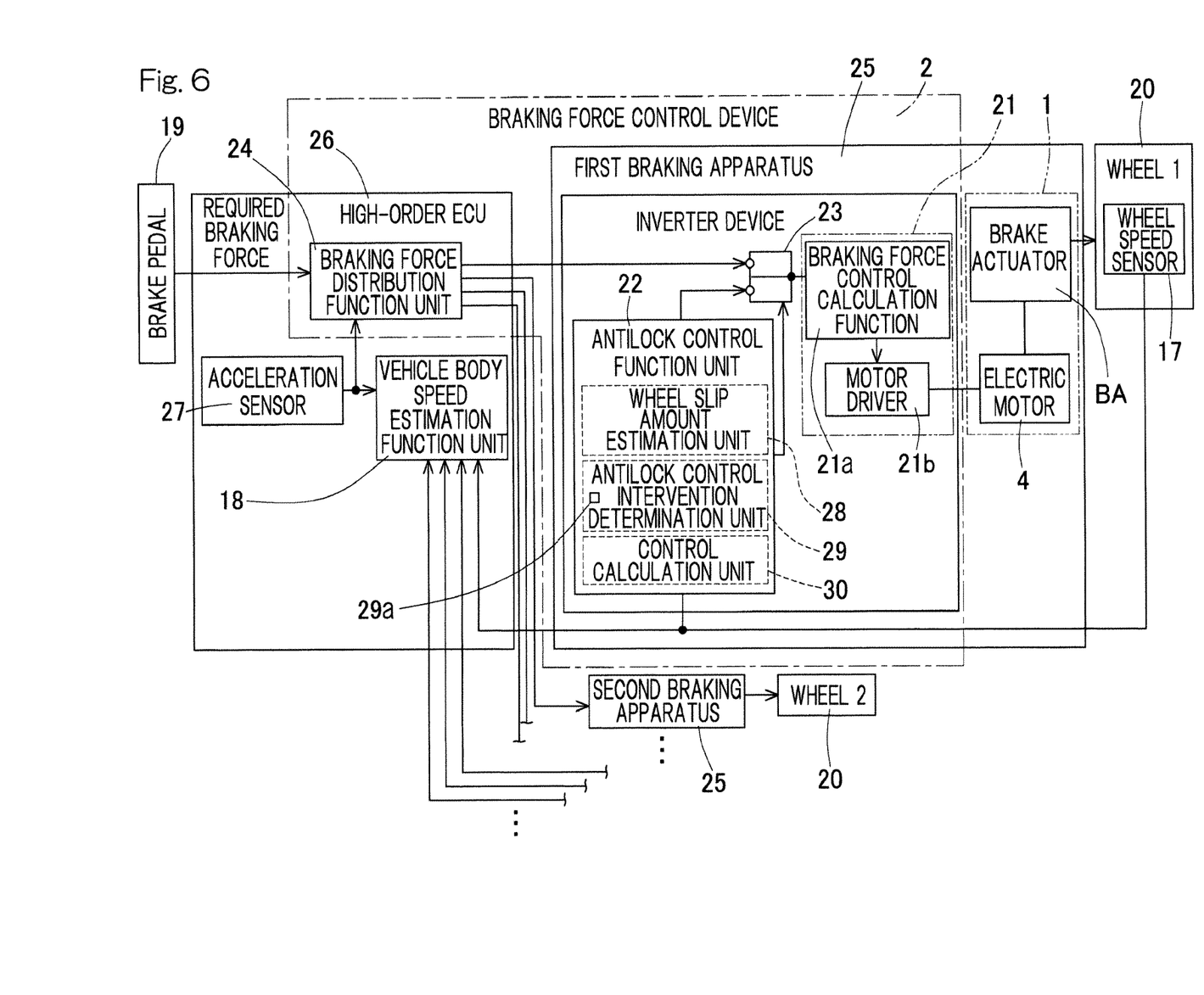
FIG. 6 is a block diagram of a control system of an electric braking system according to another embodiment of the present invention.

As shown in FIG. 6, the antilock control function unit 22 and the switching function unit 23 may be provided in the inverter device of each braking apparatus 25. In the configuration in FIG. 6, as compared to the configuration in FIG. 2 according to the previously described embodiment, calculation load on the VCU (high-order ECU) 26 having various functions is alleviated in return for increase in calculation load on each braking apparatus 25. By the antilock control function unit 22 which requires high-speed command communication being provided on the braking apparatus 25 side, a cycle of communication from the high-order ECU 26 to each braking apparatus 25 may be relatively long. An induction motor or a DC motor with brush may be used as the electric motor 4.

Although the preferred modes for carrying out the present invention have been described on the basis of the embodiments with reference to the drawings, the embodiments disclosed herein are, in all aspects, illustrative and not restrictive. The scope of the present invention is indicated by claims, not by the above description. Those skilled in the art will readily conceive numerous changes and modifications within the framework of obviousness upon the reading of the specification herein presented of the present invention. Accordingly, such changes and modifications are to be construed as included in the scope of the invention defined by claims or in a scope equivalent thereto.

REFERENCE NUMERALS

1 . . . electric braking device
2 . . . braking force control device
4 . . . electric motor
17 . . . wheel speed sensor (wheel speed estimator)
18 . . . vehicle body speed estimation function unit
19 . . . brake pedal (brake manipulator)
20 . . . wheel
21 . . . electric braking controller (normal control unit)
22 . . . antilock control function unit
23 . . . switching function unit
28 . . . wheel slip amount estimation unit
29 . . . antilock control intervention determination unit
29a . . . filter (delay element)
30 . . . control calculation unit

What is claimed is:

1. An electric braking system comprising: an electric braking device including an electric motor and configured to apply a braking force for braking a vehicle to a wheel; a braking force control device configured to execute follow-up control through control of the electric motor such that the braking force follows a given required braking force; a wheel speed estimator configured to estimate a wheel speed which is a speed of the wheel for which a braking manipulation is performed; and a vehicle body speed estimation function unit configured to estimate a vehicle body speed of the vehicle, wherein
the braking force control device includes
a normal control unit configured to execute the follow-up control such that the braking force follows the required braking force corresponding to an amount of manipulation of a brake manipulator in the vehicle, and
an antilock control function unit configured to detect, from the wheel speed estimated by the wheel speed estimator and the vehicle body speed estimated by the vehicle body speed estimation function unit, a slip of the wheel relative to a road surface with which the wheel is in contact, and execute antilock control for reducing a slip amount,
the antilock control function unit includes an antilock control intervention determination unit configured to determine whether or not to execute the antilock control, in accordance with a predetermined condition,
the braking force control device includes a switching function unit configured to switch between the follow-up control by the normal control unit and the antilock control by the antilock control function unit on the basis of the determination by the antilock control intervention determination unit,
the antilock control intervention determination unit ends execution of the antilock control when at least any one condition among the following conditions (1), (2), and (3) is satisfied while the antilock control is being executed:
condition (1): when the braking force under the antilock control becomes equal to or higher than the required braking force;
condition (2): when the required braking force becomes lower than such a braking force that the slip amount becomes equal to or lower than a predetermined value even without execution of the antilock control; and
condition (3): when the vehicle body speed becomes equal to or lower than a predetermined value, and
the antilock control intervention determination unit ends execution of the antilock control when a value obtained by having the braking force, under the antilock control, passed through a predetermined delay element becomes equal to or higher than the required braking force while the antilock control is being executed.

2. The electric braking system as claimed in claim 1, wherein
the delay element is a low-pass filter which has a frequency characteristic equal to or lower than a frequency characteristic obtained by equal-ratio conversion of a steady-state gain, at an approximate-to-zero frequency, to "1" on the basis of a gain characteristic, of the slip amount of the wheel, relative to an input frequency of the braking force.

3. The electric braking system as claimed in claim 1, wherein,
as the braking force under condition (2), on the basis of a predetermined relationship between the slip amount of each wheel and a deceleration of the vehicle, a braking force is determined which is lower than a braking force for achieving such a slip amount that an increase in the slip amount does not cause any increase in the deceleration.

4. The electric braking system as claimed in claim 1, wherein
the antilock control function unit includes a control calculation unit configured to cause, when execution of the antilock control is ended, a shift to be made over a predetermined time period from a braking force at a time of ending of the antilock control to a braking force to be executed the follow-up control by the normal control unit.

* * * * *